(12) United States Patent
Buchsbaum et al.

(10) Patent No.: US 7,191,168 B1
(45) Date of Patent: Mar. 13, 2007

(54) FAST PREFIX MATCHING OF BOUNDED STRINGS

(75) Inventors: Adam Louis Buchsbaum, Madison, NJ (US); Glenn Stephen Fowler, Scotch Plains, NJ (US); Balachander Krishnamurthy, New York, NY (US); Kiem-Phong Vo, Berkeley Heights, NJ (US); Jia Wang, Summit, NJ (US)

(73) Assignee: AT&T Corp., New York, NY (US)

( * ) Notice: Subject to any disclaimer, the term of this patent is extended or adjusted under 35 U.S.C. 154(b) by 851 days.

(21) Appl. No.: 10/254,378

(22) Filed: Sep. 25, 2002

Related U.S. Application Data (63) Continuation-in-part of application No. 09/603,154, filed on Jun. 23, 2000, now Pat. No. 6,928,485.

(60) Provisional application No. 60/350,711, filed on Nov. 13, 2001, provisional application No. 60/151,194, filed on Aug. 27, 1999.

(51) Int. Cl.
*G06F 17/30* (2006.01)

(52) U.S. Cl. ........................................................ 707/2

(58) Field of Classification Search ............... 707/1–10, 707/100–104.1, 200–206; 370/395.31, 392; 706/13
See application file for complete search history.

(56) References Cited

U.S. PATENT DOCUMENTS

| | | | |
|---|---|---|---|
| 5,651,099 A * | 7/1997 | Konsella | 706/13 |
| 5,706,507 A | 1/1998 | Schloss | |
| 5,835,720 A | 11/1998 | Nelson et al. | |
| 5,856,974 A | 1/1999 | Gervais et al. | |
| 5,937,160 A | 8/1999 | Davis et al. | |
| 6,000,020 A | 12/1999 | Chin et al. | |
| 6,006,259 A | 12/1999 | Adelman et al. | |
| 6,009,436 A | 12/1999 | Motoyama et al. | |
| 6,029,203 A | 2/2000 | Bhatia et al. | |
| 6,038,598 A | 3/2000 | Danneels | |
| 6,061,712 A | 5/2000 | Tzeng | |
| 6,067,545 A | 5/2000 | Wolff | |
| 6,078,954 A | 6/2000 | Lakey et al. | |
| 6,119,153 A | 9/2000 | Dujari et al. | |
| 6,131,067 A | 10/2000 | Girerd et al. | |
| 6,134,588 A | 10/2000 | Guenthner et al. | |
| 6,138,142 A | 10/2000 | Linsk | |
| 6,182,121 B1 | 1/2001 | Wiaschin | |
| 6,192,417 B1 | 2/2001 | Block et al. | |
| 6,195,622 B1 | 2/2001 | Altschuler et al. | |

(Continued)

OTHER PUBLICATIONS

O. Buyukkokten, et al., "Efficient Web Browsing on Handheld Devices Using Page and Form Summarization," ACM Transactions on Inform. Sys., vol. 20, Issue 1, pp. 82-115, 2002.

(Continued)

*Primary Examiner*—Diane Mizrahi (57) ABSTRACT

The present invention increases the efficiency of performing longest prefix matching operations by selecting a radix-encoded trie structure optimized with respect to memory cost. The structure is optimized by determining memory costs for retrie structures indexed on different numbers of high-order characters, and then selecting the structure corresponding to the lowest memory cost. The optimization improves performance in IP look-up operations as well as longest-prefix matching operations performed on general alphabets.

25 Claims, 5 Drawing Sheets

U.S. PATENT DOCUMENTS

| | | | |
|---|---|---|---|
| 6,243,761 B1 | 6/2001 | Mogul et al. |
| 6,253,234 B1 | 6/2001 | Hunt et al. |
| 6,266,706 B1 | 7/2001 | Brodnick et al. |
| 6,275,496 B1 | 8/2001 | Burns et al. |
| 6,295,283 B1 | 9/2001 | Falk |
| 6,304,895 B1 | 10/2001 | Schneider et al. |
| 6,330,561 B1 | 12/2001 | Cohen et al. |
| 6,343,320 B1 | 1/2002 | Fairchild et al. |
| 6,396,842 B1 | 5/2002 | Rochberger |
| 6,412,008 B1 | 6/2002 | Fields et al. |
| 6,418,544 B1 | 7/2002 | Nesbitt et al. |
| 6,425,014 B1 | 7/2002 | Aiken et al. |
| 6,470,389 B1 | 10/2002 | Chung et al. |
| 6,529,508 B1 | 3/2003 | Li et al. |
| 6,532,217 B1 | 3/2003 | Alkhatib et al. |
| 6,546,424 B1 | 4/2003 | Cucchiara |
| 6,549,538 B1 | 4/2003 | Beck et al. |
| 6,553,420 B1 | 4/2003 | Karger et al. |
| 6,560,610 B1 | 5/2003 | Eatherton et al. |
| 6,563,517 B1 | 5/2003 | Bhagwat et al. |
| 6,563,823 B1 | 5/2003 | Przygienda et al. |
| 6,570,866 B1 | 5/2003 | Murase et al. |
| 6,611,873 B1 | 8/2003 | Kanchara |
| 6,628,652 B1 | 9/2003 | Chrin et al. |
| 6,640,240 B1 | 10/2003 | Hoffman et al. |
| 6,643,706 B1 | 11/2003 | Marques et al. |
| 6,714,975 B1 | 3/2004 | Aggarwal et al. |
| 6,725,261 B1 | 4/2004 | Novaes et al. |
| 6,792,575 B1 | 9/2004 | Samaniego et al. |
| 6,876,655 B1 * | 4/2005 | Afek et al. ................. 370/392 |
| 6,928,485 B1 | 8/2005 | Krishnamurthy et al. |
| 6,970,924 B1 | 11/2005 | Chu et al. |
| 2001/0051927 A1 | 12/2001 | London et al. |
| 2002/0118682 A1 * | 8/2002 | Choe .................... 370/395.31 |
| 2002/0129086 A1 | 9/2002 | Garcia-Lune-Aceves |
| 2002/0160790 A1 | 10/2002 | Schwartz et al. |
| 2002/0198961 A1 | 12/2002 | Krishnamurthy et al. |
| 2003/0012279 A1 | 1/2003 | Chaddha |
| 2003/0046343 A1 | 3/2003 | Krishnamurthy et al. |
| 2003/0126200 A1 | 7/2003 | Wolff |
| 2003/0177175 A1 | 9/2003 | Worley et al. |
| 2003/0236793 A1 | 12/2003 | Karlsson |
| 2004/0059830 A1 | 3/2004 | Brown |
| 2004/0085928 A1 | 5/2004 | Chari et al. |
| 2004/0088571 A1 | 5/2004 | Jerrim et al. |
| 2004/0090913 A1 | 5/2004 | Scudder et al. |
| 2004/0128618 A1 | 7/2004 | Datta |
| 2004/0153558 A1 | 8/2004 | Gunduc, et al. |

OTHER PUBLICATIONS

E. Kirda, "Web Engineering Device Independent Web Services," Proc. of 23rd Int'l Conf. on Software Engineering, pp. 795-796, Toronto, 2001.

C. Anderson, et al., "Personalizing Web Sites for Mobile Users," Int'l WWW Conf, Proc. of 16th Int'l conf. on World Wide Web, pp. 569-575, Hong-Kong, 2001.

R. Han, et al., WebSplitter: A Unified XML Framework for Multi-Device Collaborative Web Browsing, Proc. of 2000 ACM Conf. on Computer Supported Cooperative Work, pp. 221-230, Philadelphia, 2000.

U.S. Appl. No. 09/603,154, filed Jun. 23, 2000.
U.S. Appl. No. 09/705,325, filed Nov. 3, 2000.
U.S. Appl. No. 09/705,675, filed Nov. 3, 2000.
U.S. Appl. No. 10/213,587, filed Aug. 7, 2002.
U.S. Appl. No. 10/213,611, filed Aug. 7, 2002.

B. Kristnamurthy & C.E. Williams, Study of Piggyback Cache Validation for Proxy Caches in the WWW, Proc. of USENIX Symposium on Internet Tech. & Systems, Montery, CA Dec. 1997.

Cheung, Gene and McCanne, Steve "Optimal Routing Table Design for IP Address Lookups Under Memory Constraints", Department of EECS, University of California, Berkeley, CA, 1999 IEEE, pp. 1437-1444.

* cited by examiner

FIG. 1

| 110 | 120 | 130 | 140 | 150 | 160 |
|---|---|---|---|---|---|
| 111→ 00100000/3 | a | [32, 63] | [32, 39] | 00100000/5 | a |
| 112→ 00101000/5 | b | [40, 47] | [40, 47] | 00101000/5 | b |
|  |  |  | [48, 63] | 00110000/4 | a |
| 11000000/2 | c | [192, 255] | [192, 207] | 11000000/4 | c |
| 11010000/4 | d | [208, 223] | [208, 223] | 11010000/4 | d |
|  |  |  | [224, 255] | 11100000/3 | c |

FIG. 2

```
while (lo <= hi)
{   for (i = 0; i < m; ++i)
        if ((lo % A[i+1]) != 0 || (lo + A[i+1] - 1) > hi)
            break;
    itvl2pfx(lo, lo + A[i] - 1) ;
    lo += A[i] ;
}
```

FIG. 3

```
for (node = root, shift = m; ; sv %= A[shift])
{   shift -= node >> (bbits+1) ;
    if (node & (1 << bbits))
        node = Node [(node & ((1 << bbits - 1)) + sv/A[shift]] ;
    else return Leaf [(node & ((1 << bbits - 1)) + sv/A[shift]] ;
}
```

| ROUTING TABLE | ENTRIES | NEXT-HOPS | DATA STRUCTURE SIZE (KB) | | | | |
|---|---|---|---|---|---|---|---|
| | | | retrie | | | lctrie | CDG |
| | | | −FL | −LR | −GR | | |
| AADS | 32505 | 38 | 1069.49 | 866.68 | 835.61 | 763.52 | 4446.37 |
| ATT | 71483 | 45 | 2508.79 | 2231.89 | 2180.21 | 1659.52 | 15601.92 |
| FUNET | 41328 | 18 | 506.57 | 433.00 | 411.36 | 967.36 | 682.93 |
| MAE-WEST | 71319 | 38 | 1241.14 | 1040.37 | 1000.52 | 1654.06 | 5520.26 |
| OREGON | 118190 | 33 | 3828.93 | 3107.78 | 3035.73 | 2711.16 | 12955.85 |
| PAIX | 17766 | 28 | 912.94 | 741.92 | 723.85 | 417.74 | 3241.31 |
| TELSTRA | 104096 | 182 | 2355.03 | 2023.08 | 1971.78 | 2384.66 | 9863.96 |

FIG. 6

| ROUTING TABLE | DATA STRUCT. | SGI | | | | PENTIUM | | | |
|---|---|---|---|---|---|---|---|---|---|
| | | BUILD (ms) | QUERY (ns) | | | BUILD (ms) | QUERY (ns) | | |
| | | | TRAFFIC | SORT. RAND. | RAND. | | TRAFFIC | SORT. RAND. | RAND. |
| AADS | retrie-FL | 195 | | 15 | 20 | 150 | | 25 | 48 |
| | retrie-LR | 225 | | 15 | 20 | 180 | | 24 | 42 |
| | retrie-GR | 4157 | | 15 | 20 | 3010 | | 22 | 40 |
| | lctrie | 113 | | 160 | 215 | 100 | | 153 | 380 |
| | CDG | 214 | | 17 | 144 | 220 | | 25 | 69 |
| ATT | retrie-FL | 459 | 18 | 16 | 31 | 370 | 20 | 32 | 83 |
| | retrie-LR | 518 | 17 | 16 | 22 | 440 | 18 | 31 | 68 |
| | retrie-GR | 9506 | 17 | 16 | 22 | 7220 | 19 | 31 | 66 |
| | lctrie | 245 | 163 | 159 | 214 | 270 | 146 | 181 | 452 |
| | CDG | 1011 | 64 | 39 | 224 | 1010 | 42 | 43 | 85 |
| FUNET | retrie-FL | 166 | 14 | 14 | 18 | 120 | 14 | 20 | 28 |
| | retrie-LR | 190 | 14 | 14 | 17 | 130 | 14 | 21 | 24 |
| | retrie-GR | 1650 | 14 | 14 | 17 | 1020 | 14 | 19 | 24 |
| | lctrie | 136 | 134 | 149 | 199 | 140 | 111 | 153 | 381 |
| | CDG | 102 | 15 | 14 | 20 | 70 | 8 | 14 | 26 |
| MAE-WEST | retrie-FL | 340 | | 14 | 21 | 270 | | 28 | 65 |
| | retrie-LR | 388 | | 15 | 20 | 310 | | 26 | 52 |
| | retrie-GR | 8241 | | 15 | 21 | 6950 | | 26 | 49 |
| | lctrie | 233 | | 155 | 210 | 250 | | 176 | 454 |
| | CDG | 325 | | 19 | 152 | 310 | | 33 | 73 |
| OREGON | retrie-FL | 447 | | 15 | 67 | 350 | | 34 | 76 |
| | retrie-LR | 512 | | 16 | 23 | 390 | | 31 | 59 |
| | retrie-GR | 8252 | | 16 | 23 | 7740 | | 31 | 56 |
| | lctrie | 383 | | 155 | 341 | 420 | | 206 | 464 |
| | CDG | 949 | | 26 | 142 | 1050 | | 41 | 81 |
| PAIX | retrie-FL | 118 | | 15 | 20 | 90 | | 24 | 36 |
| | retrie-LR | 132 | | 14 | 18 | 90 | | 22 | 30 |
| | retrie-GR | 2100 | | 14 | 18 | 1360 | | 22 | 28 |
| | lctrie | 66 | | 162 | 213 | 60 | | 146 | 284 |
| | CDG | 136 | | 15 | 123 | 150 | | 22 | 58 |
| TELSTRA | retrie-FL | 508 | | 16 | 27 | 420 | | 37 | 86 |
| | retrie-LR | 572 | | 16 | 21 | 480 | | 31 | 62 |
| | retrie-GR | 10000 | | 15 | 21 | 8510 | | 31 | 56 |
| | lctrie | 343 | | 155 | 311 | 390 | | 201 | 458 |
| | CDG | 599 | | 26 | 180 | 610 | | 47 | 83 |

FIG. 7

| ROUTING TABLE | DATA STRUCTURE SIZE (KB) | | | | | | |
|---|---|---|---|---|---|---|---|
| | depth-2 retrie ~730 | | | depth-3 retrie ~740 | | | lctrie |
| | -FL | -LR | -GR | -FL | -LR | -GR | |
| 710 — PREF | 13554.87 | 13068.88 | 13054.80 | 3181.63 | 2878.24 | 2889.90 | 3795.91 |
| 720 — LEN | 5704.37 | 4938.74 | 4785.66 | 1400.84 | 1045.53 | 990.33 | 3795.91 |

FIG. 8

| MACHINE | TABLE | OPERATION | TIMES (BUILD: ms) (QUERY: ns) | | | | | | |
|---|---|---|---|---|---|---|---|---|---|
| | | | depth-2 retrie | | | depth-3 retrie | | | lctrie |
| | | | -FL | -LR | -GR | -FL | -LR | -GR | |
| SGI | PREF | BUILD | 1732 | 2028 | 25000 | 6919 | 7478 | 43000 | 801 |
| | | QUERY (APACHE) | 20 | 19 | 19 | 36 | 35 | 35 | 136 |
| | | QUERY (EW3) | 20 | 19 | 19 | 36 | 36 | 36 | 139 |
| | LEN | BUILD | 1299 | 1495 | 28000 | 4299 | 4476 | 25000 | 588 |
| | | QUERY (APACHE) | 15 | 16 | 16 | 32 | 32 | 32 | 135 |
| | | QUERY (EW3) | 15 | 16 | 16 | 33 | 32 | 32 | 139 |
| PENTIUM | PREF | BUILD | 1300 | 1570 | 19000 | 4670 | 5060 | 32000 | 750 |
| | | QUERY (APACHE) | 26 | 26 | 26 | 41 | 40 | 40 | 121 |
| | | QUERY (EW3) | 27 | 27 | 27 | 43 | 42 | 42 | 129 |
| | LEN | BUILD | 990 | 1170 | 25000 | 2860 | 3070 | 18000 | 640 |
| | | QUERY (APACHE) | 21 | 21 | 21 | 35 | 34 | 34 | 117 |
| | | QUERY (EW3) | 23 | 21 | 21 | 37 | 35 | 35 | 124 |

FIG. 9

| MOUTH | COUNTS | Retrie(s) | Bsearch(s) |
|---|---|---|---|
| 1 | 27,479,712 | 24.35 | 83.51 |
| 2 | 25,510,814 | 22.37 | 74.73 |
| 3 | 28,993,583 | 25.49 | 84.60 |
| 4 | 28,452,823 | 24.94 | 80.76 |
| 5 | 29,786,302 | 26.11 | 84.86 |
| 6 | 28,874,669 | 25.27 | 80.79 |

FAST PREFIX MATCHING OF BOUNDED STRINGS

This application claims the benefit of U.S. provisional application No. 60/350,711, filed on Nov. 13, 2001, the contents of which are fully incorporated herein by reference.

This application is a continuation-in-part of U.S. patent application Ser. No. 09/603,154 filed on Jun. 23, 2000, now U.S. Pat. No. 6,928,485 which claims the benefit of U.S. provisional application No. 60/151,194 filed Aug. 27, 1999, the contents of which are fully incorporated herein by reference.

FIELD OF THE INVENTION

The present invention relates generally to fast prefix matching, and, more particularly, to the use of dynamic programming for optimizing a radix encoded trie structure used for prefix look-up. The disclosed methods have uses including IP routing, network clustering and telephone marketing.

BACKGROUND OF THE INVENTION

Longest Prefix Matching (LPM) is the problem of determining from a set of strings the longest one that is a prefix of some other, given string. LPM is at the heart of many important applications. Internet Protocol (IP) routers routinely forward packets by computing from their routing tables the longest bit string that forms a prefix of the destination address of each packet. In copending U.S. patent application Ser. No. 09/603,154, filed Jun. 23, 2000 and entitled "Network-Aware Clustering of Web Clients," Krishnamurthy and Wang describe a method for clustering Web clients by identifying a set of IP addresses that with high probability are under common administrative control and topologically close together. Such clustering information has applications ranging from network design and management to providing on-line quality of service differentiation based on the origin of a request. The proposed clustering approach is network aware in that addresses are grouped based on prefixes in snapshots of border gateway protocol (BGP) routing tables.

Telephone network management and marketing applications often classify regions in the country by area codes or combinations of area codes and the first few digits of the local phone numbers. For example, the state of New Jersey is identified by area codes such as 201, 908, and 973. In turn, Morris County in New Jersey is identified by longer telephone prefixes like 908876 and 973360. Those applications typically require computing in seconds or minutes summaries of calls originating and terminating at certain locations from daily streams of telephone calls, up to hundreds of millions records at a time. That requires very fast classification of telephone numbers by finding the longest matching telephone prefixes.

LPM solutions must be considered in the context of the intended use to maximize performance. The LPM applications discussed above have some common characteristics:

1. Look-ups overwhelmingly dominate updates of the prefix sets. A router may route millions of packets before its routing table changes. Similarly, telephone number classifications rarely change, but hundreds of millions of phone calls are made daily.

2. The look-up rate is extremely demanding. IP routing and clustering may require worst-case LPM performance of a couple hundred nanoseconds per look-up. That severely limits the number of machine instructions and memory references allowed.

3. Prefixes and strings are bounded in length and based on small alphabets. For example, current IP addresses are 32-bit strings and U.S. telephone numbers are 10-digit strings.

The first two characteristics mean that certain theoretically appealing solutions based on, e.g., suffix trees, string prefix matching or dynamic string searching are not applicable, as their performance would not scale. Fortunately, the third characteristic means that specialized data structures can be designed with the desired performance levels. In the present application, the inventors disclose a system and method that may be generalized to bounded strings such as telephone numbers.

The present application discloses retries, a novel, fast, and compact data structure for LPM on general alphabets. Simulation experiments based on trace data from real applications show that retries outperform other published data structures for IP routing. By extending LPM to general alphabets, retries also admit new applications that could not exploit prior LPM solutions designed for IP look-ups.

The popularity of the Internet has made IP routing an important area of research. Several LPM schemes for binary strings have been disclosed in this context. For example, the idea of using ranges induced by prefixes to perform IP look-ups was suggested in B. Lampson, V. Srinivasan, & G. Varghese, "IP Lookups Using Multiway and Multicolumn Search," IEEE/ACM Trans. Netwk., 7(3):324–34 (1999). The authors of that paper describe a method for routing Internet packets exploiting a simple relationship between IP prefixes and nested intervals of natural numbers. That method was later analyzed by Gupta, Prabhakar, and Boyd in "Near-Optimal Routing Lookups with Bounded Worst Case Performance," Proc. 19th IEEE INFOCOM, vol. 3, p. 1184–92 (2000), to guarantee worst-case performance. The method, however, is not generalized to other instances of LPM such as non-binary strings and arbitrary alphabets.

Multi-level table look-up schemes are used for both hardware and software implementations for IP routing. Since modern machines use memory hierarchies with sometimes dramatically different performance levels, some implementations attempt to build data structures conforming to the memory hierarchies at hand. Both the LC (level compression)-trie scheme of S. Nilsson & G. Karlsson, "IP-Address Lookup Using LC-Tries," IEEE J. Sel. Area. Comm., 17(6):1083–92 (1999), and the multi-level table of V. Srinivasan & G. Varghese, "Fast Address Lookup Using Controlled Prefix Expansion," ACM Trans. Comp. Sys., 17(1):1–40 (1999), attempt to optimize for L2 caches by adjusting the number of levels to minimize space usage. Efficient implementations, however, exploit the binary alphabet of IP addresses and prefixes.

G. Cheung & S. McCanne, "Optimal Routing Table Design for IP Address Lookup Under Memory Constraints," Proc. 18th IEEE INFOCOM, vol. 3, p. 1437–44 (1999), took a more general approach to dealing with memory hierarchies that includes the use of prefix popularity. Those authors consider a multi-level table scheme similar to retries and attempt to minimize the space usage of popular tables so that they fit into the fast caches. Since the cache sizes are limited, they must solve a complex constrained optimization problem to find the right data structure. L1 caches on most machines are very small, however, so much of the gain comes from fitting a data structure into L2 caches. In addition, the popularity of prefixes is a dynamic property and not easy to approximate statically. Cheung & McCanne do not focus on bounding the number of memory accesses and minimizing memory usage.

P. Crescenzi, L. Dardini & R. Grossi, in "IP Address Lookup Made Fast and Simple," Proc. 7th ESA, vol. 1643 of LNCS, p. 65–76, Springer-Verlag (1999), proposed a compressed-table data structure for IP look-up. The key idea is to identify runs induced by common next-hops among the $2^{32}$ implicit prefixes to compress the entire table with that information. The technique works well when the number of distinct next-hops is small and there are few runs, which is mostly the case in IP routing. The compressed-table data structure is fast, because it bounds the number of memory accesses per match. Unfortunately, in network clustering applications, both the number of distinct next-hop values and the number of runs can be quite large. Thus, that technique is not practical in such applications.

It is therefore desirable to provide a method for fast prefix matching that may be generalized for arbitrary alphabets, uses a limited amount of memory and does not involve solving complex optimization problems.

SUMMARY OF THE INVENTION

The present invention addresses those needs by providing a method for optimizing a retrie table for matching prefixes.

One embodiment of the invention is a method for building a radix-encoded trie structure for a set P of bounded strings. According to the method, for each of a plurality of integer values i, a memory cost is determined for a radix-encoded trie structure having a first level indexed on i highest order characters of the strings of set P. One of the plurality of integer values i, corresponding to a lowest memory cost, is selected. A radix-encoded trie structure is then built for the strings of set P, the structure having a first level indexed on i highest-order characters of the strings.

In that method, the step of determining a memory cost for a radix-encoded trie structure may include computing a sum of a memory cost of internal table entries; a memory cost of data entries for strings of set P having a length no greater than i; and a memory cost of radix-encoded trie sub-structures for strings of set P having a length greater than i.

The step of determining a memory cost for a radix-encoded trie structure may include computing a memory cost of internal table entries equal to $c_t \alpha^i$, wherein $c_t$ is a cost of an internal table entry and $\alpha$ is an alphabet size used in the strings of set P.

The step of determining a memory cost for a radix-encoded trie structure may further include computing a memory cost of data entries for strings of set P having lengths no greater than i, the cost being equal to $c_d |P^{\leq i}|$, wherein $C_d$ is a cost of a data entry and $P^{\leq i}$ is a subset of the strings of set P comprising strings having lengths no greater than i.

The step of determining a memory cost for a radix-encoded trie structure may further include computing a memory cost of radix-encoded trie sub-structures for each subset Q of set P comprising strings having a length greater than i and having i identical high-order characters, the cost being equal to $\Sigma_{Q \in L(P,i)} S(strip(Q,i),k-1)$, wherein L(P,i) is a partition of those strings of set P having lengths greater than i, into equivalence classes induced by i high-order characters, strip(Q,i) is a set of the strings of Q with i high-order characters stripped off, k is a number of levels in the radix encoded trie structure, and S(strip(Q,i),k−1) computes a size of a trie sub-structure for strip(Q,i) having k−1 levels.

The method may also include the step of modifying the set P of bounded strings by first deriving a set of disjoint intervals from the strings, and then redefining the set P from the disjoint intervals.

Further, the method may include the step of instantiating the radix-encoded trie structure in one or more superstrings. In that case, the step of instantiating the trie structure in superstrings may comprise merging left and right ends of leaf tables of the trie structure in best-fit order, or may comprise computing the superstrings using a greedy shortest common superstring approximation.

In another embodiment of the invention, a machine readable medium is provided, containing configuration instructions for performing the above-described method.

In still another embodiment of the invention, a method is provided for building a radix-encoded trie structure for a set of string prefixes. That method includes the step of forming an interval set by associating with each string prefix of the prefix set an interval containing strings that begin with the string prefix. A disjoint interval set is formed by, where a first of said intervals is contained in a second of said intervals, replacing the first interval with at most two new intervals contained in the first interval and outside the second interval. A new set of string prefixes is then constructed from the disjoint interval set. A radix-encoded trie structure is selected for the new set of prefixes, the structure corresponding to a lowest memory cost. The selected radix-encoded trie structure is then built for the new set of prefixes.

In that embodiment, the step of selecting a radix-encoded trie structure may include, for each of a plurality of integer values i, determining a memory cost for a radix-encoded trie structure having a first level indexed on i highest order bits of the prefixes in the new set of prefixes and selecting a value of i corresponding to a lowest memory cost. In that case, the step of building the selected radix-encoded trie structure includes building a structure having a first level indexed on i highest-order bits of the prefixes.

The method may also include the step of sorting the intervals of the interval set by low ends before forming the disjoint interval set. In that case, the sorting step may include breaking ties by taking longer intervals first.

The method may also include the step of instantiating the radix-encoded trie structure in one or more superstrings. The step of instantiating the trie structure may comprise merging left and right ends of leaf tables of the trie structure in best-fit order, or may comprise computing the superstrings using a greedy shortest common superstring approximation.

These and other advantages of the invention will be apparent to those of ordinary skill in the art by reference to the following detailed description and the accompanying drawings.

DETAILED DESCRIPTION

Figure 1:
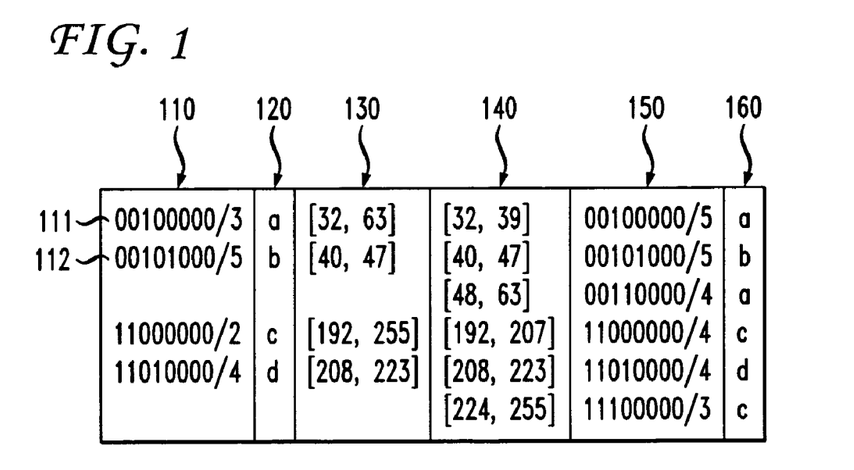
FIG. 1 is a table showing a prefix set and corresponding intervals.

Referring to FIG. 1, a sample prefix set 110 is illustrated by showing four strings using a binary alphabet A={0,1} and maximum string length m=8; i.e., 8-bit strings. Values 120 are data stored in association with each of the strings. For example, the first string 111 in the set would best match the string 00100101, yielding result a. On the other hand, the second string 112 would best match 00101101, yielding b.

Let A be an alphabet of finite size a $\alpha=\delta+1$. Without loss of generality, assume that A is the set of natural numbers in the range [0,δ]. Otherwise, map A's elements to their ranks in any fixed, arbitrary order. Then, the elements of A may be thought of as digits in base α so that a string $s=s_1 s_2 \ldots s_k$ over A represents an integer $v=s_1\alpha^{k-1}+s_2\alpha^{k-2}+ \ldots +s_k$. The functions t and σ are defined so that t(s)=v and σ(v)=s. When working with fixed length strings, σ(v) have enough 0's padded on the left to gain that length. For example, when the string 1001 represents a number in base 2, t(01001) is the decimal value 9. Conversely, in base 3 and with prescribed length 6, σ(9) is the string 000100. Clearly, for any two strings s and t with equal lengths, t(s)<t(t) if and only if s precedes t lexicographically.

Longest Matching Prefixes and Shortest Containing Intervals

Let m be some fixed integer. Consider $A^{\leq m}$ and $A^m$, respectively, the sets of strings over A with lengths ≤m and lengths exactly equal to m. Let $P \subseteq A^{\leq m}$, and with each p∈P let there be associated a data value; the data values need not be mutually distinct. We define an LPM instance (A, m) as the problem of finding the data value associated with the longest string in P that is a prefix of some string s∈$A^m$. P is commonly called the prefix set, and its elements are called prefixes. Following a convention in IP routing, strings shall be denoted s/k where s is a string and k≤len(s) to mean the prefix of s with k digits.

For any string s in $A^{\leq m}$, let $s^0$=s0 . . . 0 and $s^\delta$=sδ . . . δ a be two strings in which enough 0's and δ's are used to pad s to length m. Using the above correspondence between strings and integers, s can be associated with the closed interval of integers $[t(s^0),t(s^\delta)]$. That interval is denoted I(s), and its length is $t(s^\delta)-t(s^0)+1$.

Now let v be in I(s), and consider the string σ(v), 0-padded on the left to be length m. By construction, σ(v) must agree with $s^0$ and $s^\delta$ up to the length of s. On the other hand, if v<t($s^0$), then σ(v) lexicographically precedes $s^0$, so s cannot be a prefix of σ(v). A similar argument applies when v>t($s^\delta$). It therefore follows that:

LEMMA 1: Let s be a string in $A^{\leq m}$ and v<$\alpha^m$. Then s is a prefix of σ(v) if and only if v is in I(s).

For any prefix set P, I(P) is used to denote the set of intervals associated with prefixes in P. Now consider two prefixes $p_1$ and $p_2$ and their corresponding intervals $I(p_1)$ and $I(p_2)$. Applying Lemma 1 to the endpoints of those intervals shows that either the intervals are completely disjoint or one is contained in the other. Furthermore, $I(p_1)$ contains $I(p_2)$ if and only if $p_1$ is a prefix of $p_2$ Next, when s has length m, $t(s^0)=t(s^\delta)=t(s)$. Lemma 1 asserts that if p is a prefix of s then I(P) must contain t(s). The nested property of intervals in a prefix set P then gives:

THEOREM 2: Let P be a prefix set and s a string in $A^m$. Then p is the longest prefix matching s if and only if I(p) is the shortest interval in I(P) containing t(s).

Column 130 of FIG. 1 shows the correspondence between prefixes and intervals. For example, the string 00101101 with numerical value 45 would have [40,47] as the shortest containing interval, giving b as the matching result.

Two intervals that are disjoint or nested are called nested intervals. Theorem 2 enables treating the LPM problem as that of managing a collection of mutually nested intervals with the following basic operations:

Insert inserts a new interval [a,b] with some associated data value v. If [a,b] intersects an existing interval, it is required that [a,b] is contained in or contains that interval.

Retract deletes an existing interval [a,b] from the current set of intervals.

Get gets, for a integer value p, the value associated with the shortest interval, if any, that contains p.

When m and α are small, the integers arising from strings and interval endpoints are storable in standard computer integer types. As described in more detail below, that allows construction of practical data structures for LPM based on integer arithmetic.

Equivalence Among LPM Instances and Prefix Sets

A data structure solving an (A,m) instance can sometimes be used for other instances, as follows. Let (B,n) be another instance of the LPM problem with β the size of B and n the maximal string length. Suppose that $\alpha^m \geq \beta^n$. Since the integers corresponding to strings in $\beta^{\leq n}$ are less than $\alpha^m$, they can be represented as strings in $A^{\leq m}$. Furthermore, let I(p) be the interval corresponding to a prefix p in $B^{\leq n}$. Each integer in I(p) can be considered an interval of length 1, so it is representable as a prefix of length m in $A^{\leq m}$. Thus, each string and prefix set in (B,n) can be translated into some other string and prefix set in (A,m). It therefore follows:

THEOREM 3: Let (A,m) and (B,n) be two instances of the LPM problem in which the sizes of A and B are α and β respectively. Then any data structure solving LPM on (A,m) can be used to solve (B,n) as long as $\alpha^m \geq \beta^n$.

Figure 2:
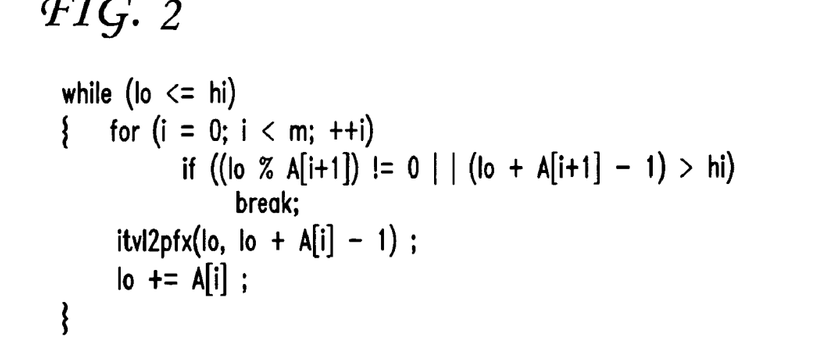
FIG. 2 is a listing of code for constructing prefixes covering an interval.

That use of single values in an interval to generate prefixes is inefficient. Let [lo,hi] be some interval where lo<$\alpha^m$ and hi<$\alpha^m$. FIG. 2 shows an algorithm (in C) for constructing prefixes from [lo,hi]. A simple induction argument on the quantity hi−lo+1 shows that the algorithm constructs the minimal set of subintervals covering [lo,hi] such that each subinterval corresponds to a single prefix in $A^{\leq m}$. We assume an array A[ ] such that A[i] has the value $\alpha^i$. The function itvl2pfx( ) converts an interval into a prefix by inverting the process of mapping a prefix into an interval described earlier. Note that such a prefix will have length m−i.

Given a nested set of intervals I, it is possible to construct a minimal set of prefixes P(I) such that (1) I(p) and I(q) are disjoint for p≠q; and (2) finding the shortest interval in I containing some integer i is the same as finding the longest prefix in P(I) matching σ(i). That is done as follows:

1. Sort the intervals in I by their low ends, breaking ties by taking longer intervals first. The nested property of the intervals means that [i, j]<[k,l] in this ordering if j<k or [i, j] contains [k,l].

2. Build a new set of intervals by adding the sorted intervals in order. When an interval [i, j] is added, if it is contained in some existing interval [k,l], then in addition to adding [i, j], replace [k,l] with at most two new disjoint intervals, [k,i−1] and [j+1,l], whenever they are of positive length.

3. Merge adjacent intervals that have the same data values.

4. Apply the algorithm of FIG. 2 to each of the resulting intervals to construct the new prefixes.

Column 140 of FIG. 1 shows how the nested intervals are split into disjoint intervals. Those intervals are then transformed into a new collection of prefixes, shown in column 150. Data values 160 are assigned to the new prefixes according to the original assignments. A property of the new prefixes is that none of them can be a prefix of another.

In the remainder of the present discussion, each considered prefix set P shall represent disjoint intervals. If not, that prefix set is converted into the equivalent set of prefixes P(I(P)) as discussed.

The Retrie Data Structure

Theorem 3 asserts that any LPM data structure for one type of string can be used for other LPM instances as long as alphabet sizes and string lengths are within bounds. For example, 15-digit international telephone numbers fit in 64-bit integers, so data structures for fast look-ups of IPv4 32-bit addresses are potentially usable, with proper extensions, for telephone number matching. Unfortunately, many of those data structures are too highly tuned for IP routing to be effective in the other applications considered herein, such as network address clustering and telephone number matching. A retrie data structure is therefore described below for fast LPM queries in $A^{\leq m}$.

Let P be a prefix set in $A^{\leq m}$. Each prefix in P is associated with some data value, an integer in a given range [0,D]. We could build a table of size $\alpha^m$ that covers the contents of the intervals in P. Then, the LPM of a string can be looked up with a single index. Such a table would be impossibly large, however, for interesting values of $\alpha$ and m. We therefore build a smaller, recursively structured table, which we call a radix-encoded trie (or retrie). The top level table is indexed by some number of left digits of a given string. Each entry in this table points to another table, indexed by some of the following digits, and so on. As such, there are two types of tables: internal and leaf. An entry of an internal table has a pointer to the next level table and indicates whether that table is an internal or leaf table. An entry of a leaf table contains the data associated with the prefix matched by that entry. All internal tables are kept in a single array Node, and all leaf tables are kept in a single array Leaf.

Described below is a technique for minimizing the space used by the entire retrie. The size of a leaf entry depends on the maximum of the data values associated with the given prefixes. For example, if the maximum data value is $<2^8$, then a leaf entry may be stored in a single byte while a maximum data value between $2^8$ and $2^{16}$ means that leaf data must be stored using 2 bytes, and so on. For fast computation, the size of an internal table entry is chosen so that the entry would fit in some convenient integer type. The bits of that type are partitioned into three parts (pbits, ibit, bbits) as follows. The first pbits bits define the number of digits used to index the next level table, which thus has $\alpha^{pbits}$ entries. The single ibit bit is either 1, indicating that the next level is internal, or 0, indicating that the next level is leaf. The last bbits bits define the offset into the Node or Leaf array at which the next level table begins.

In a currently preferred embodiment, 32-bit integers are used for internal table entries with the partition (5, 1, 26). Up to 31 digits can thus be used to index a table, and the maximal number of entries in the arrays Node and Leaf is $2^{26}$. That is ample for the herein-described applications. For larger applications, 64-bit table entries can be used with some other appropriate bit partitions.

Figure 3:
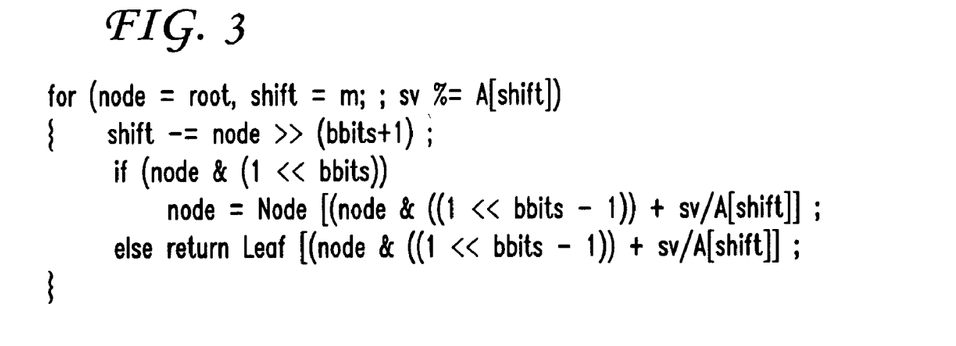
FIG. 3 is a listing of code for searching a retrie for a longest prefix.

Given a retrie built for some prefix set $P \subseteq A^{\leq m}$, let root be a single internal table entry whose bits are initialized to tell how to index the top level table. Let A[ ] be an integer array such that A[i]=$\alpha^i$. Now let s be a string in $A^m$ with integer value sv=t(s). FIG. 3 shows an algorithm to compute the data value associated with the LPM of s.

Figure 4:
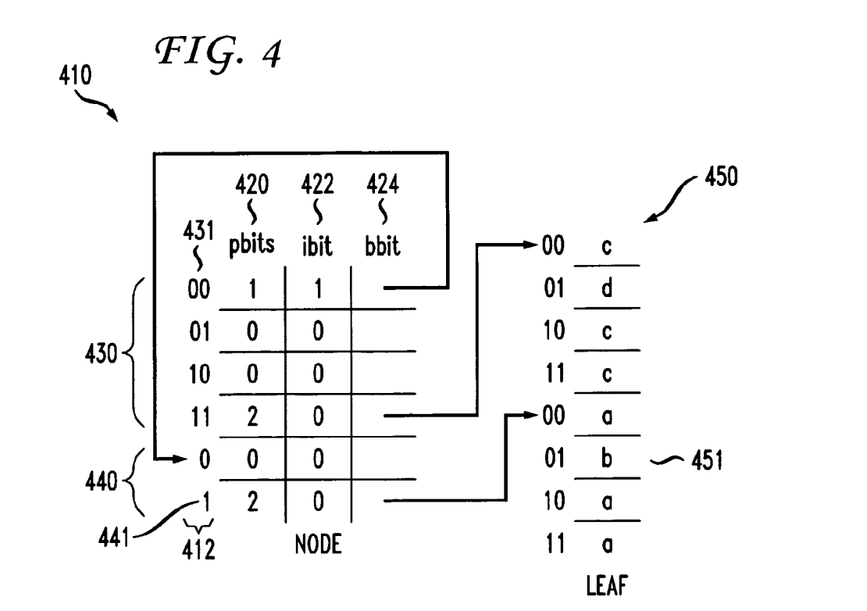
FIG. 4 is a table showing a retrie data structure.

FIG. 4 shows a 3-level retrie for the prefix set shown in column 150 of FIG. 1. The Node array begins with the top-level internal table 410. Indices 412 to the left of table entries are in binary and with respect to the head of the corresponding table within the Node or Leaf array. Each internal table entry has three parts 420, 422, 424 as discussed. All internal table entries without the third part go to the same leaf table entry that has some default value for strings without any matching prefix. For example, the string 00101101 is matched by first stripping off the starting 2 bits 00 to index entry 0 (row 431) of the top level table (rows 430). The ibit of that entry is 1, indicating that the next level is another internal table. The third part, bbits, of the entry 431 points to the base (rows 440) of that table. The pbits of the entry 431 indicate that one bit should be used to index the next level. Then, the indexed entry (row 441) in the next level table points to a leaf table 450. The entries of that table are properly defined so that the fourth and fifth bits of the string, 01, index the entry with the correct data, b (row 451).

A retrie with k levels enables matching with at most k indexing operations. That guarantee is important in applications such as IP forwarding. Smaller k's mean larger look-up tables, so it is important to ensure that a retrie with k levels uses minimal space. We next discuss how to do this using dynamic programming.

Given a prefix set P, define len(P)=max{len(p): p∈P}. For $1 \leq i \leq$ len(P), let $P^{\leq i}$ be the subset of prefixes with lengths $\leq i$. Then, let L(P,i) be the partition of P–$P^{\leq i}$ into equivalence classes induced by the left i digits. That is, each part Q in L(P,i) consists of all prefixes longer than i and having the same first i digits. Now, let strip(Q,i) be the prefixes in Q with their left i digits stripped off. Such prefixes represent disjoint intervals in the LPM instance (A,m–i). Finally, let $C_d$ be the size of a data (leaf table) entry and $c_t$ the size an internal table entry. The following dynamic program computes S(P,k), the optimal size of a retrie data structure for a prefix set P using k levels.

If P=0 or k=1, then $S(P,k) = c_d \alpha^{len(P)}$.

Otherwise, $S(P,k) = \min\{c_d \alpha^{len(P)}, \min_{1 \leq i < len(P)} \{c_t \alpha^i + c_d |P^{\leq i}| + \Sigma_{Q \in L(P,i)} S(strip(Q,i), k-1)\}\}$.

The first case states that a leaf table is built whenever the prefix set is empty or only a single level is allowed. The second case recurses to compute the optimal retrie and its size. The first part of the minimization considers the case when a single leaf table is constructed. The second part of the minimization considers the cases when internal tables may be constructed. In these cases, the first term $c_t \alpha^i$ expresses the size of the constructed internal table to be indexed by the first i digits of a string. The second term $c_d |P^{\leq i}|$ expresses the fact that each prefix short enough to end at the given level requires a single leaf table entry for its data value. The last term $\Sigma_{Q \in L(P,i)} S(strip(Q,i), k-1)$ recurses down each set strip(Q,i) to compute a retrie with optimal size for it.

Each set strip(Q,i) is uniquely identified by the string formed from the digits stripped off from the top level of the recursion until strip(Q,i) is formed. The number of such strings is bounded by |P|len(P). Each such set contributes at most one term to any partition of the len(P) bits in a prefix. For k≦len(P), the dynamic program examines all partitions of [1,len(P)] with ≦k parts. The number of such partitions is $O(\text{len}(P)^{k-1})$. Thus, we have:

THEOREM 4: The cost to compute S(P,k) is $O(|P|\text{len}(P)^k)$.

In practice, len(P) is bounded by a small constant, e.g., 32 for IP routing and 10 for U.S. phone numbers. Since the number of levels cannot exceed len(P), the dynamic program essentially runs in time linear in the number of prefixes.

The internal and leaf tables are sequences of elements. In the dynamic program, each table is considered to be instantiated in the Node or Leaf array as it is created. Memory usage is reduced by exploiting redundancies, especially in the leaf tables. For example, in IP routing, the leaf tables often contain many similar, long runs of relatively few data values. Computing a short superstring of the tables reduces space very effectively. Three possible heuristics were considered by the inventors:

1. The trivial superstring is formed by catenating the leaf tables.
2. The left and right ends of the leaf tables are merged in best-fit order.
3. A superstring is computed using a standard greedy SCS (Shortest Common Superstring) approximation.

Both methods 2 and 3 effectively reduce space usage, as shown below. In practice, however, the second method gives the best trade-off between computation time and space reduction.

Finally, it is possible to add superstring computation of leaf tables in the dynamic program to estimate more accurately the actual sizes of the leaf tables. That would better guide the dynamic program to select an optimal overall lay-out. The high cost of superstring computation, however, makes this impractical. Thus, the superstring lay-out of leaf tables is done only after the dynamic program finishes.

Applications and Performance

The inventors have considered three applications of the present invention: IP routing, network clustering, and telephone marketing. Each application exhibits different characteristics. In current IP routing, the strings are 32 bits long, and the number of distinct data values, i.e., next-hops, is small. For network clustering, several BGP tables are merged together and either the prefixes or their lengths are used as data values so that after a look-up, the matching prefix itself is retrieved. In that case, either the number of data values is large or there are many runs of data values. For routing and clustering, retries are compared to LC-tries, and to the compressed-table data structure of Crescenzi, Dardini, and Grossi (see above). The authors' code for both benchmarks was used. The inventors' test suite included the FUNET router table and traffic trace used in the LC-trie work. Those data structures are designed specifically for IP prefix matching. The third application is telephone marketing, in which strings are telephone numbers.

Figure 5:
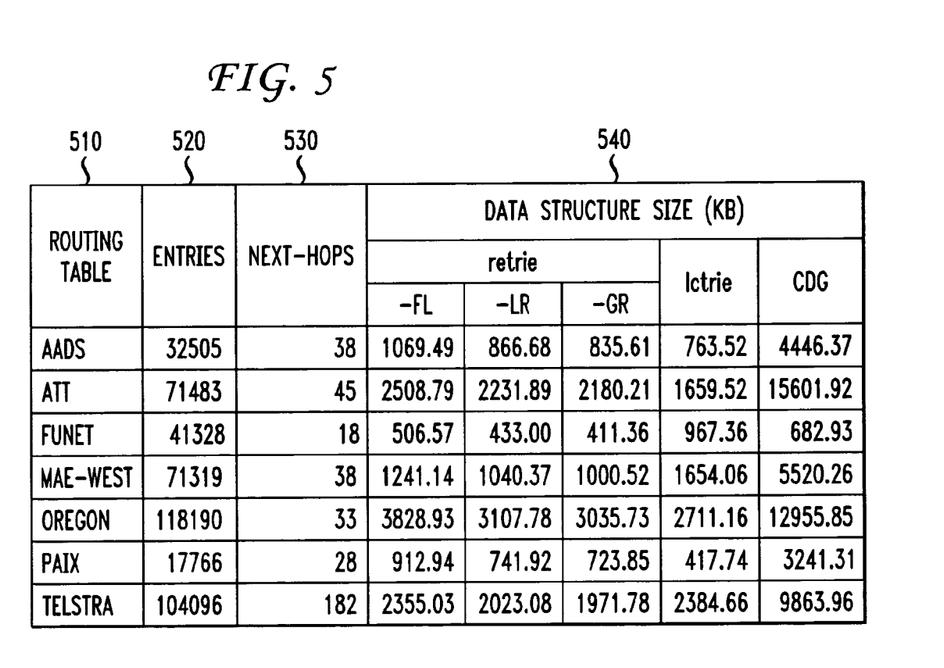
FIG. 5 is a table of data used in an IP routing experiment.

FIG. 5 is a table summarizing the routing tables 510 used by the inventors in testing the invention as applied to IP routing. It reports how many distinct prefixes 520 and next-hops 530 each routing table contained and the sizes 540 of the data structures built on each. Retrie-FL (rsp, -LR; -GR) is a depth-2 retrie with catenated (rsp., left-right, best-fit merge; greedy) record layout. For routing, depth was limited to 2 to emphasize query time. The inventors used deeper retries in network clustering tests described below.

The LPM query timing was engendered by router traffic. Since the real traffic traces were not available for the tables other than ATT and FUNET, the inventors constructed random traces by choosing, for each table, 100,000 prefixes uniformly at random (with replacement) and extending them to full 32-bit addresses. Each random trace was used as generated and also with the addresses sorted lexicographically to present locality that might be expected in a real router. Random traces were generated for the ATT and FUNET tables as well, to juxtapose real and random data. Each trace was processed through the respective table 100 times, measuring average LPM query time; each data structure was built from scratch for each unique prefix table. Data structure build times are also reported.

Figure 6:
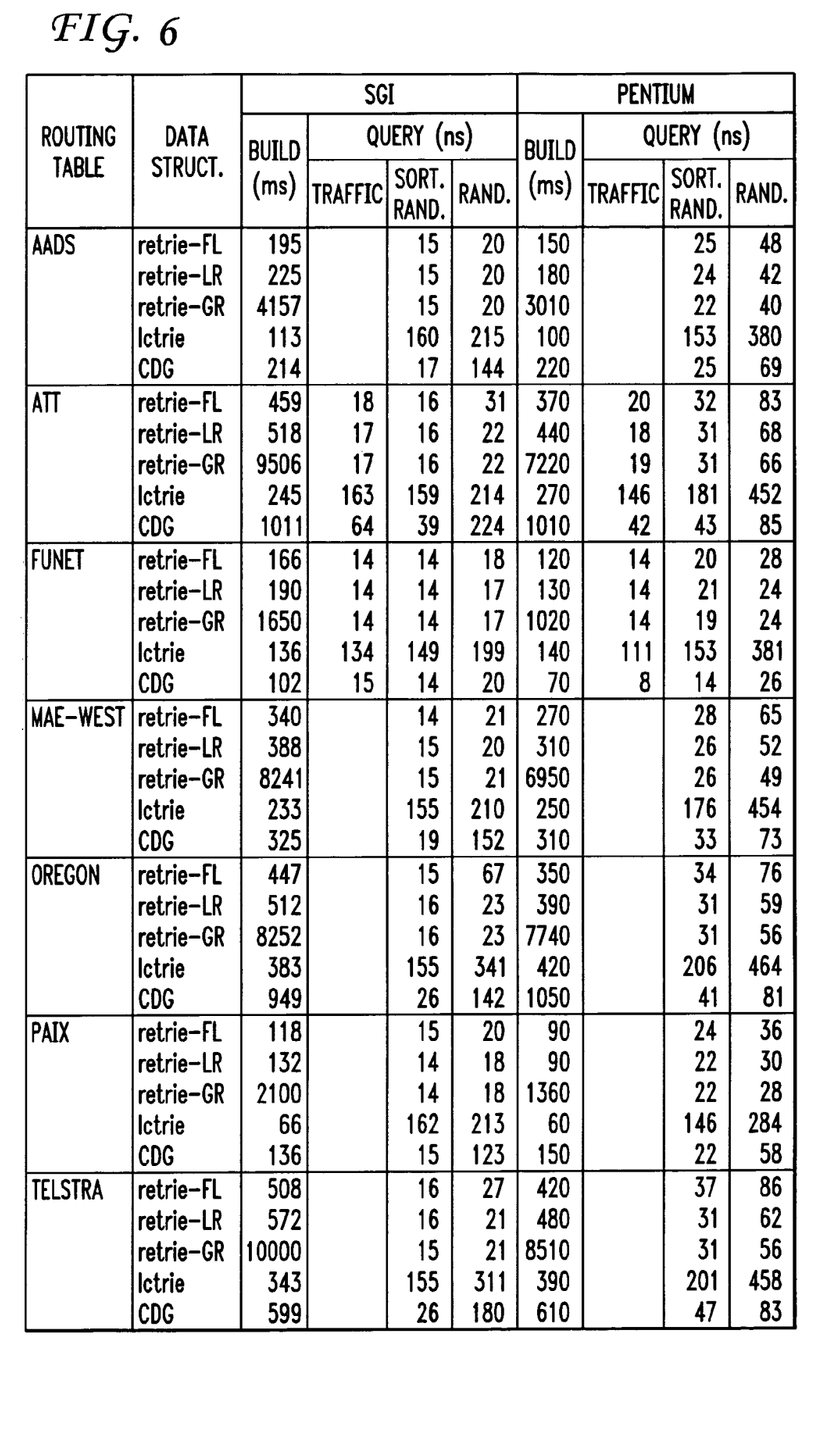
FIG. 6 is a table of results of an IP routing experiment.

The inventors performed the evaluation on an SGI Challenge and a Pentium. The SGI ran IRIX 6.5 on a 400 MHz R12000 with split 32 KB L1 data and instruction caches, 8 MB unified L2 cache, and 12 GB main memory. The Pentium ran Linux 2.4.6 on a 1 GHz Pentium III with split 16 KB L1 data and instruction caches, 256 KB unified L2 cache, and 256 MB main memory. Each time reported is the median of five runs. FIG. 6 is a table reporting the results.

LC-tries were designed to fit in L2 cache and do so on all the tables on the SGI but none on the Pentium. Retries behave similarly, although they were not designed to be cache resident. CDG fits in the SGI cache on AADS, FUNET, MAE-WEST, and PAIX. Retries uniformly outperformed LC-tries, sometimes by an order of magnitude, always by a factor exceeding three. CDG outperformed retries only on some of the FUNET traces on the Pentium. For that table, the numbers of prefixes and next-hops were relatively low, and CDG is sensitive to those sizes. On the larger tables (OREGON and TELSTRA), retries significantly outperformed CDG. As routing tables are continually growing, with 250,000 entries expected by 2005, it is expected that retries will outperform CDG on real data. Furthermore, the FUNET trace was filtered to zero out the low-order 8 bits of each address for privacy purposes and thus is not a true trace for the prefix table, which contains some entries longer than 24 bits.

The data suggest that the non-trivial superstring retrie variations significantly reduce the space of the data structure. As might be expected, the greedy superstring approximation is comparatively slow, but the best-fit merge runs with little time degradation over the trivial superstring method and still provides significant space savings.

There is a nearly uniform improvement in look-up times from retrie-FL to retrie-LR to retrie-GR even though each address look-up performs exactly the same computation and memory accesses in all three cases. That suggests beneficial effects from the hardware caches. The improvement is likely due to the overlapping of leaf tables in retrie-LR and retrie-GR, which both minimizes space usage and increases the hit rates for similar next-hop values.

The data also suggest that LPM queries on real traces run significantly faster than on random traces. Again that suggests beneficial cache effects, from the locality presented by IP routing traffic. Real trace data is thus critical for accurate measurements, although random data seem to provide an upper bound to real-world performance.

Finally, while retries take longer to build than LC-tries (and sometimes CDG), build time (for -FL and -LR) is acceptable, and query time is more critical to routing and on-line clustering, which is assessed next.

In analyzing the present invention as applied to network clustering, the routing tables used above were combined. There are 168,161 unique network addresses in the tables.

The goal of clustering is to recover the actual matching prefix for an IP address, thereby partitioning the addresses into equivalence classes. PREF assigns each resulting prefix itself as the data value. LEN assigns the length of each prefix as its data value, which is sufficient to recover the prefix, given the input address. PREF, therefore, has 168,161 distinct data values, whereas LEN has only 32.

Figure 7:
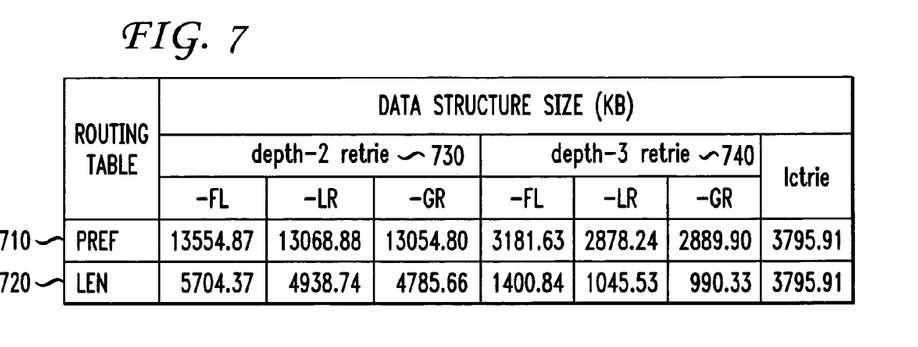
FIG. 7 is a table showing data structure sizes in a clustering experiment.

The inventors built depth-2 and -3 retries and LC-tries for PREF and LEN. FIG. 7 is a table detailing the data structure sizes. There is a significant difference in retrie sizes for the two tables PREF 710 and LEN 720. The relative sparseness of data values in LEN produces a much smaller Leaf array, which can also be more effectively compressed by the superstring methods. Further, the space reduction achieved by depth-3 retries 740 compares favorably to that achieved by depth-2 retries 730. Depth-3 retries are smaller than LC-tries for this application, yet, as shown below, outperform the latter. CDG could not be built on either PREF or LEN. CDG assumes a small number of next-hops and exceeded memory limits for PREF on both machines. CDG failed on LEN, because the number of runs of equal next-hops was too large. Here the difference between the IP routing and clustering applications of LPM becomes striking: retries work for both applications, but CDG cannot be applied to clustering.

Figure 8:
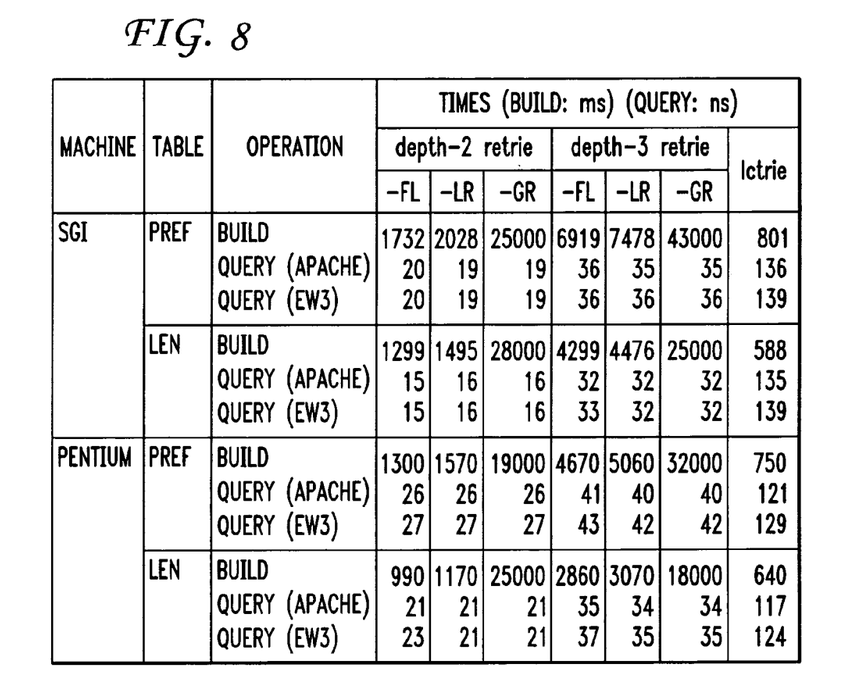
FIG. 8 is a table of results of a clustering experiment.

Build times and query times for clustering of Apache and EW3 server logs are shown in the table of FIG. 8. Apache contains IP addresses recorded at www.apache.org. The 3,461,361 records gathered in late 1997 had 274,844 unique IP addresses. EW3 contains IP addresses of clients visiting three large corporations whose content were hosted by AT&T's Easy World Wide Web. Twenty-three million entries were gathered for the analysis, representing 229,240 unique IP addresses. The experimental setup was as in the routing assessment. Clustering is an on-line application: the data structures are built once (e.g., daily), and addresses are clustered as they are processed, e.g., by a web server. Thus, query time is paramount. Retries significantly outperform LC-tries for this application, even at depth 3, as shown in FIG. 8.

In testing the telephone marketing application of the invention, the market was divided into regions, each of which is identified by a set of telephone prefixes. Given daily traces of telephone calls, the application classifies the callers by regions, updates usage statistics, and generates a report. Such reports may help in making decisions on altering the level of advertisement in certain regions. For example, the set of prefixes identifying Morris County, N.J., includes 908876 and 973360. Thus, a call originating from a telephone number of the form 973360XXXX would match Morris County, N.J.

Figure 9:
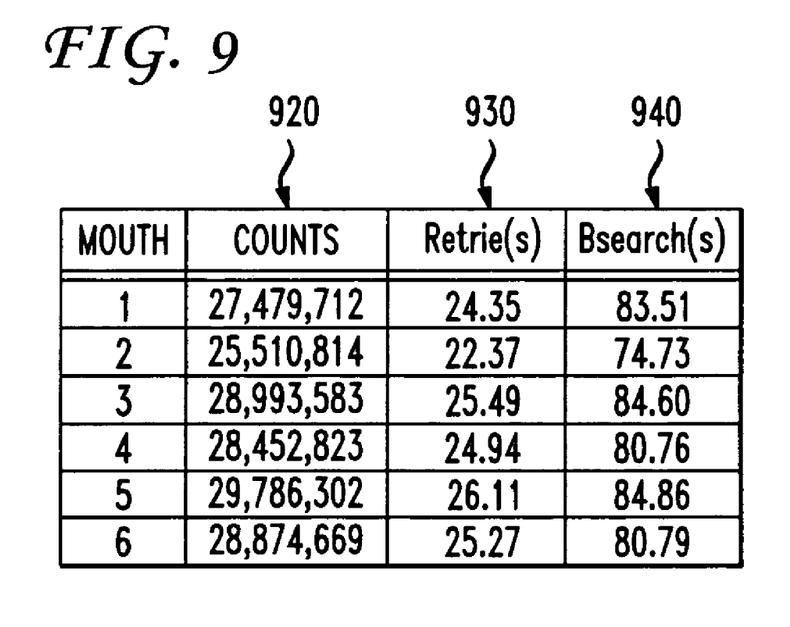
FIG. 9 is a table of results of a telephone number classification experiment.

The table of FIG. 9 shows performance results (on the above SGI) from using a retrie to summarize telephone usage in different regions of the country for a six-month period. The second column 910 shows the number of call records per month that were used in the experiment. Since this application is off-line, we consider the total time required to classify all the numbers. The third column 930 shows that time (in seconds) for retries, and the fourth column 940 contrasts the time using a binary search approach for matching. The table shows the benefit of using retries in a telephone marketing application. Previous IP look-up data structures do not extend to this alphabet.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been described with particular emphasis on network routing, network clustering and telephone marketing. However, the principles of the present invention could be extended to any bounded prefix matching problem involving strings using any alphabet. Such an extension could be readily implemented by one of ordinary skill in the art given the above disclosure.

We claim:

1. A method for generating a radix-encoded trie structure for a set P of bounded strings, comprising the steps of:

for each of a plurality of integer values i, determining a memory cost for a radix-encoded trie structure having a first level indexed on i highest order characters of the strings of set P;

selecting one of the plurality of integer values i corresponding to a lowest memory cost;

generating a radix-encoded trie structure for the strings of set P, the structure having a first level indexed on i highest-order characters of the strings; and storing said radix-encoded trie structure for said strings of set P in a computer readable storage memory.

2. The method of claim 1, wherein the step of determining a memory cost for a radix-encoded trie structure comprises computing a sum of:

a memory cost of internal table entries;

a memory cost of data entries for strings of set P having a length no greater than i; and a memory cost of radix-encoded trie sub-structures for strings of set P having a length greater than i.

3. The method of claim 1 wherein the step of determining a memory cost for a radix-encoded trie structure comprises computing a memory cost of internal table entries equal to:

$$c_t \alpha^i$$

wherein $c_t$ is a cost of an internal table entry and $\alpha$ is an alphabet size used in the strings of set P.

4. The method of claim 1 wherein the step of determining a memory cost for a radix-encoded trie structure comprises computing a memory cost of data entries for strings of set P having lengths no greater than i, the cost being equal to:

$$c_d |P^{\leq i}|$$

wherein $c_d$ is a cost of a data entry and $P^{\leq i}$ is a subset of the strings of set P comprising strings having lengths no greater than i.

5. The method of claim 1 wherein the step of determining a memory cost for a radix-encoded trie structure comprises computing a memory cost of radix-encoded trie sub-structures for each subset Q of set P comprising strings having length greater than i and having i identical high-order characters, the cost being equal to:

$$\Sigma_{Q \in L(P,i)} S(\mathrm{strip}(Q,i), k-1)$$

wherein L(P,i) is a partition of those strings of set P having lengths greater than i, into equivalence classes induced by i high-order characters, strip(Q,i) is a set of the strings of Q with i high-order characters stripped off, k is a number of levels in the radix encoded trie structure, and S(strip(Q,i),k−1) computes a size of a trie sub-structure for strip(Q,i) having k−1 levels.

6. The method of claim 1, further comprising the step of modifying the set P of bounded strings by first deriving a set of disjoint intervals from the strings, and then redefining the set P from the disjoint intervals.

7. The method of claim 1, further comprising the step of instantiating the radix-encoded trie structure in one or more superstrings.

8. The method of claim 7, wherein the step of instantiating the trie structure in superstrings comprises merging left and right ends of leaf tables of the trie structure in best-fit order.

9. The method of claim 7, wherein the step of instantiating the trie structure in superstrings comprises computing the superstrings using a greedy shortest common superstring approximation.

10. A method for building a radix-encoded trie structure for a set of string prefixes, comprising the steps of:
   forming an interval set by associating with each string prefix of the prefix set an interval containing strings that begin with the string prefix;
   forming a disjoint interval set by, where a first of said intervals is contained in a second of said intervals, replacing the first interval with at most two new intervals contained in the first interval and outside the second interval;
   constructing a new set of string prefixes from the disjoint interval set;
   selecting a radix-encoded trie structure for the new set of prefixes, the structure corresponding to a lowest memory cost;
   generating the selected radix-encoded trie structure for the new set of prefixes; and
   storing said radix-encoded trie structure for said strings of set P in a computer readable storage memory.

11. The method of claim 10, wherein the step of selecting a radix-encoded trie structure includes; for each of a plurality of integer values i, determining a memory cost for a radix-encoded trie structure having a first level indexed on i highest order bits of the prefixes in the new set of prefixes and selecting a value of i corresponding to a lowest memory cost; and wherein the step of generating the selected radix-encoded trie structure comprises generating a structure having a first level indexed on i highest-order bits of the prefixes.

12. The method of claim 10, further comprising the step of sorting the intervals of the interval set by low ends before forming the disjoint interval set.

13. The method of claim 12, wherein the sorting step includes breaking ties by taking longer intervals first.

14. The method of claim 10, further comprising the step of instantiating the radix-encoded trie structure in one or more superstrings.

15. The method of claim 14, wherein the step of instantiating the trie structure in superstrings comprises merging left and right ends of leaf tables of the trie structure in best-fit order.

16. The method of claim 14, wherein the step of instantiating the trie structure in superstrings comprises computing the superstrings using a greedy shortest common superstring approximation.

17. A computer readable storage medium containing configuration instructions for performing a method for building a radix-encoded trie structure for a set P of bounded strings, the method comprising the steps of:
   for each of a plurality of integer values i, determining a memory cost for a radix-encoded trie structure having a first level indexed on i highest order characters of the strings of set P;
   selecting one of the plurality of integer values i corresponding to a lowest memory cost;
   generating a radix-encoded trie structure for the strings of set P, the structure having a first level indexed on i highest-order characters of the strings; and
   storing said radix-encoded trie structure for said strings of set P in a computer readable storage memory.

18. The computer readable storage medium of claim 17, wherein the step of determining a memory cost for a radix-encoded trie structure comprises computing a sum of:
   a memory cost of internal table entries;
   a memory cost of data entries for strings of set P having a length no greater than i; and
   a memory cost of radix-encoded trie sub-structures for strings of set P having a length greater than i.

19. The computer readable storage medium of claim 17 wherein the step of determining a memory cost for a radix-encoded trie-structure comprises computing a memory cost of internal table entries equal to:

$$c_t \alpha^i$$

wherein $c_t$ is a cost of an internal table entry and $\alpha$ is alphabet size used in the strings of set P.

20. The computer readable storage medium of claim 17 wherein the step of determining a memory cost for a radix-encoded trie structure comprises computing a memory cost of data entries for strings of set P having lengths no greater than i, the cost being equal to:

$$c_d |P^{\leq i}|$$

wherein $c_d$ is a cost of a data entry and $P^{\leq i}$ is a subset of the strings of set P comprising strings having lengths no greater than i.

21. The computer readable storage medium of claim 17 wherein the step of determining a memory cost for a radix-encoded trie structure comprises computing a memory cost of radix-encoded trie sub-structures for each subset Q of set P comprising strings having a length greater than i and having i identical high-order characters, the cost being equal to:

$$\Sigma_{Q \in L(P,i)} S(\text{strip}(Q,i), k-1)$$

wherein L(P,i) is a partition of those strings of set P having lengths greater than i, into equivalence classes induced by i high-order characters, strip(Q,i) is a set of the strings of Q with i high-order characters stripped off, k is a number of levels in th radix encoded trie structure, and S(strip(Q,i),k−1) computes a size of a trie substructure for trip(Q,i) having k−1 levels.

22. The computer readable storage medium of claim 17, further comprising the step of modifying the set P of bounded strings by first deriving a set of disjoint intervals from the strings, and then redefining the set P from the disjoint intervals.

23. The computer readable storage medium of claim 17, further comprising the step of instantiating the radix-encoded trie structure in one or more superstrings.

24. The computer readable storage medium of claim 23, wherein the step of instantiating the trie structure in superstrings comprises merging left and right ends of leaf tables of the trie structure in best-fit order.

25. The computer readable storage medium of claim 23, wherein the step of instantiating the trie structure in superstrings comprises computing the superstrings using a greedy shortest common superstring approximation.

* * * * *